United States Patent
Salter et al.

(10) Patent No.: US 12,198,277 B1
(45) Date of Patent: Jan. 14, 2025

(54) DISPLAYING A PRIORITIZED OFFSCREEN INDICATOR

(71) Applicant: Apple Inc., Cupertino, CA (US)

(72) Inventors: Thomas G. Salter, Foster City, CA (US); Gregory Patrick Lane Lutter, Boulder Creek, CA (US); Rahul Nair, Santa Clara, CA (US); Devin William Chalmers, Oakland, CA (US); Ioana Negoita, San Jose, CA (US)

(73) Assignee: APPLE INC., Cupertino, CA (US)

( * ) Notice: Subject to any disclaimer, the term of this patent is extended or adjusted under 35 U.S.C. 154(b) by 397 days.

(21) Appl. No.: 17/556,510

(22) Filed: Dec. 20, 2021

Related U.S. Application Data

(60) Provisional application No. 63/131,539, filed on Dec. 29, 2020.

(51) Int. Cl.
| | |
|---|---|
| G06T 19/00 | (2011.01) |
| G06F 3/01 | (2006.01) |
| G06F 3/03 | (2006.01) |
| G06T 7/70 | (2017.01) |
| G06T 11/60 | (2006.01) |

(52) U.S. Cl.
CPC ............ G06T 19/006 (2013.01); G06F 3/013 (2013.01); G06F 3/03 (2013.01); G06T 7/70 (2017.01); G06T 11/60 (2013.01)

(58) Field of Classification Search
None
See application file for complete search history.

(56) References Cited

U.S. PATENT DOCUMENTS

| | | | |
|---|---|---|---|
| 8,971,970 B2 | 3/2015 | Lindner | |
| 10,510,191 B2 | 12/2019 | Powderly et al. | |
| 10,750,245 B1* | 8/2020 | Zeiler | G06F 16/745 |
| 11,202,117 B2* | 12/2021 | El Essaili | H04N 21/25808 |
| 11,301,684 B1* | 4/2022 | Kumar | G06V 20/41 |
| 11,698,677 B1* | 7/2023 | Chiu | G06F 3/017 |
| | | | 345/629 |
| 11,753,029 B1* | 9/2023 | Gregory | G08G 1/205 |
| | | | 701/301 |
| 2001/0056427 A1* | 12/2001 | Yoon | G06F 16/78 |
| 2012/0154619 A1* | 6/2012 | Lee | G06V 30/142 |
| | | | 348/222.1 |
| 2017/0052766 A1* | 2/2017 | Garipov | G06F 16/24575 |
| 2017/0069143 A1* | 3/2017 | Salter | G06F 3/012 |
| 2019/0188868 A1* | 6/2019 | Bagnall | G06T 7/75 |
| 2019/0362557 A1 | 11/2019 | Lacey et al. | |
| 2020/0174262 A1* | 6/2020 | Godar | G06F 3/015 |
| 2020/0250245 A1* | 8/2020 | Abhyankar | G06F 16/953 |

(Continued)

*Primary Examiner* — Jwalant Amin
(74) *Attorney, Agent, or Firm* — Fernando & Partners, LLP

(57) ABSTRACT

A method is performed at an electronic device with a one or more processors, a non-transitory memory, and a display. The method includes presenting, on the display, a plurality of objects including a first object and a second object. The method includes obtaining a first display priority value that is associated with the first object. The method includes prioritizing the first object over the second object based on a function of the first display priority value. The method includes, in response to determining that each of the first object and the second object satisfies an offscreen criterion, displaying, on the display, a first offscreen indicator that is associated with the first object according to the prioritization.

23 Claims, 17 Drawing Sheets

(56) References Cited

U.S. PATENT DOCUMENTS

| | | | |
|---|---|---|---|
| 2021/0201038 A1* | 7/2021 | Xia | G11B 27/031 |
| 2021/0264226 A1* | 8/2021 | Lecue | G06N 3/042 |
| 2021/0365113 A1* | 11/2021 | Chalmers | G06F 3/011 |
| 2021/0398353 A1* | 12/2021 | Luo | G06T 7/11 |
| 2022/0012283 A1* | 1/2022 | Richter | G06F 16/7837 |

* cited by examiner

DISPLAYING A PRIORITIZED OFFSCREEN INDICATOR

CROSS-REFERENCE TO RELATED APPLICATIONS

This application claims priority to U.S. Provisional Patent App. No. 63/131,539 filed on Dec. 29, 2020, which is hereby incorporated by reference in its entirety.

TECHNICAL FIELD

The present disclosure relates to displaying content, and in particular displaying a prioritized offscreen indicator.

BACKGROUND

At any given time, a previously available device may present a plurality of objects at different respective positions on a display. In various circumstances, the plurality of objects may move offscreen, whereby the previously available device ceases to present the plurality of objects. Tracking the respective last-displayed positions of the plurality of objects is cumbersome for a user. The previously available device does not effectively assist the user in the tracking, resulting in a degraded user experience.

SUMMARY

In accordance with some implementations, a method is performed at an electronic device with one or more processors, a non-transitory memory, and a display. The method includes presenting, on the display, a plurality of objects including a first object and a second object. The method includes obtaining a first display priority value that is associated with the first object. The method includes prioritizing the first object over the second object based on a function of the first display priority value. The method includes, in response to determining that each of the first object and the second object satisfies an offscreen criterion, displaying, on the display, a first offscreen indicator that is associated with the first object according to the prioritization.

In accordance with some implementations, an electronic device includes one or more processors, a non-transitory memory, and a display. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION OF IMPLEMENTATIONS

Figure 1:
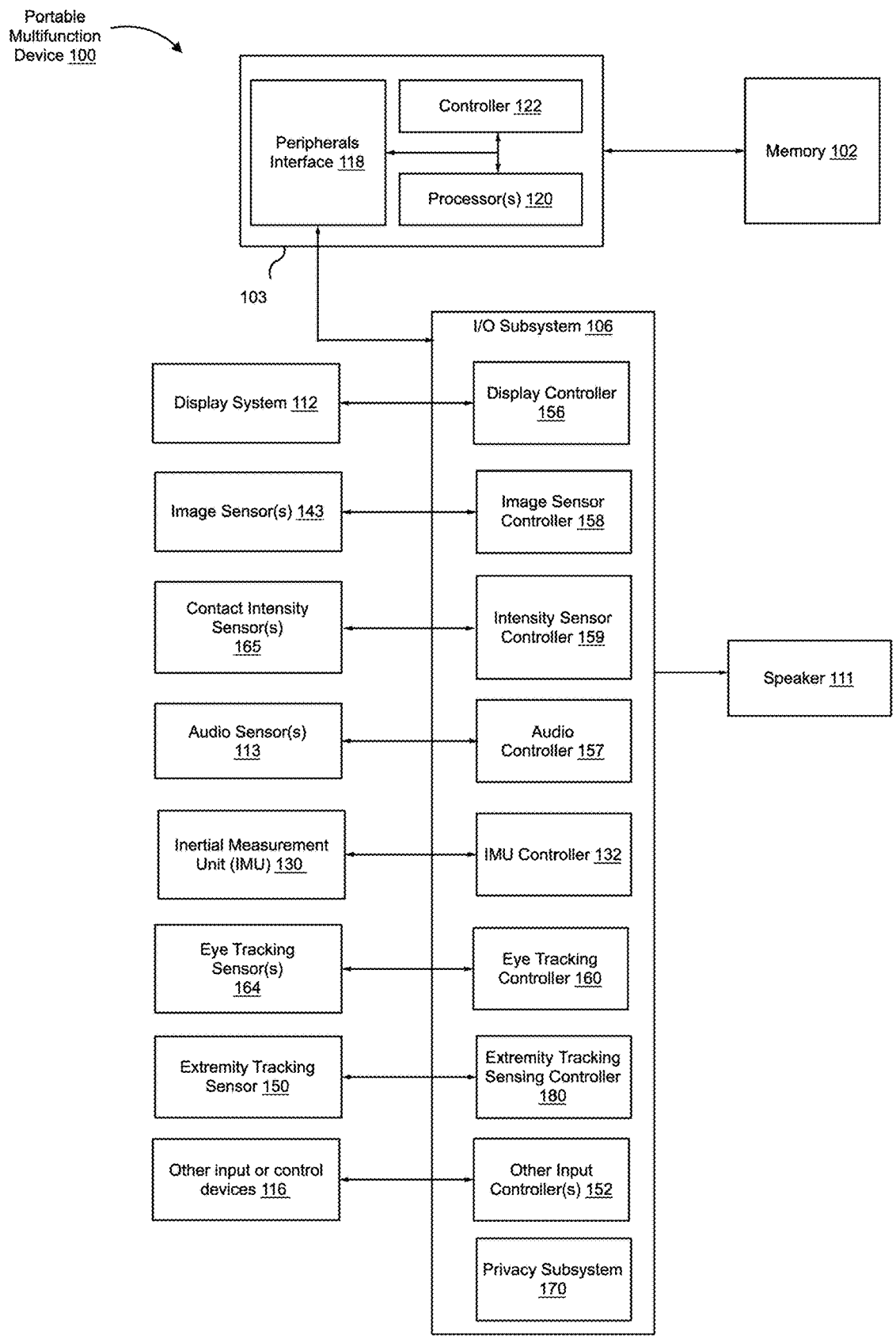
FIG. 1 is a block diagram of an example of a portable multifunction device in accordance with some implementations.

At any given time, a device may present a plurality of objects at different respective positions on a display. For example, the plurality of objects includes a combination of computer-generated objects and respective representations of physical objects. In various circumstances, the plurality of objects may move offscreen, whereby the device ceases to present the plurality of objects or portions thereof. Tracking the respective last-displayed positions of the plurality of objects is cumbersome for a user. User tracking is especially cumbersome when a relatively large number of objects moves offscreen and/or when the last-displayed positions are relatively far from each other. However, the device does not provide an effective technique for assisting the user in the tracking, resulting in a degraded user experience.

By contrast, various implementations disclosed herein include methods, electronic devices, and systems for displaying one or more prioritized offscreen indicators. To that end, in some implementations, an electronic device selectively displays one or more offscreen indicators for a corresponding one or more objects that move offscreen, based on associated display priority value(s). For example, the electronic device prioritizes a first object over a second object based on a first display priority value that is associated with the first object. Continuing with this example, based on the prioritization, the electronic device displays a first offscreen indicator when the first object satisfies an offscreen criterion, while foregoing displaying an offscreen indicator for the second object when the second object satisfies the offscreen criterion.

In some implementations, the first display priority value is based on a function of an object characteristic associated with the first object, such as an object type or object importance. As another example, in some implementations, the first display priority value is a function of a first engagement score that characterizes a level of user engagement (e.g., user focus) with respect to the first object. For example, based on extremity tracking data, the electronic device determines that a user's extremity is proximate to the first object. As another example, the electronic device determines, based on eye tracking data, that the user's gaze is more focused on the first object than on the second object. In some implementations, the electronic device determines the first engagement score based on a combination of eye tracking data and extremity tracking data.

In some implementations, each of the first object and the second object satisfies the offscreen criterion when the first and second objects are less than a threshold distance from an edge (e.g., same edge or different edges) of the display. In some implementations in which a particular object represents a physical (real-world) object, the electronic device performs a computer-vision technique with respect to image data representing the physical object in order to determine whether the particular object satisfies the offscreen criterion. In some implementations, one or more of the first object and the second object satisfies the offscreen criterion based on a positional change of the electronic device. For example, in response to a rotation of the electronic device, the electronic device ceases to present the first and second objects, or moves the first and second objects within a threshold distance from an edge of the display. In some implementations, one or more of the first object and the second object is characterized by one or more respective animations satisfying the offscreen criterion.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

Various examples of electronic systems and techniques for using such systems in relation to various computer-generated reality technologies are described.

A physical environment refers to a physical world that people can sense and/or interact with without aid of electronic systems. The physical environment may include physical features such as a physical surface or a physical object. For example, the physical environment corresponds to a physical park that includes physical trees, physical buildings, and physical people. People can directly sense and/or interact with the physical environment, such as through sight, touch, hearing, taste, and smell. In contrast, an extended reality (XR) environment refers to a wholly or partially simulated environment that people sense and/or interact with via an electronic system. An XR environment may correspond to one of a virtual reality (VR) environment, an augmented reality (AR) environment, or a mixed reality (MR) environment. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. As another example, an XR system corresponds to a mobile device (e.g., a smartphone or tablet) that detects a movement of the mobile device relative to an XR environment and accordingly modifies displayed content within the XR environment. In some situations (e.g., for accessibility reasons), adjustments to characteristic(s) of virtual object(s) in an XR environment may be made in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, finger-wearable device, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time of flight sensor that obtains depth information characterizing a particular object.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may have a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a finger-wearable device.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a finger-wearable device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

FIGS. 2A-2J are an example of an electronic device 210 displaying a prioritized offscreen indicator in accordance with some implementations. In some implementations, the electronic device 210 is similar to and adapted from the electronic device 100 in FIG. 1. In some implementations, the electronic device 210 generates an extended reality (XR) environment.

Figure 2A:
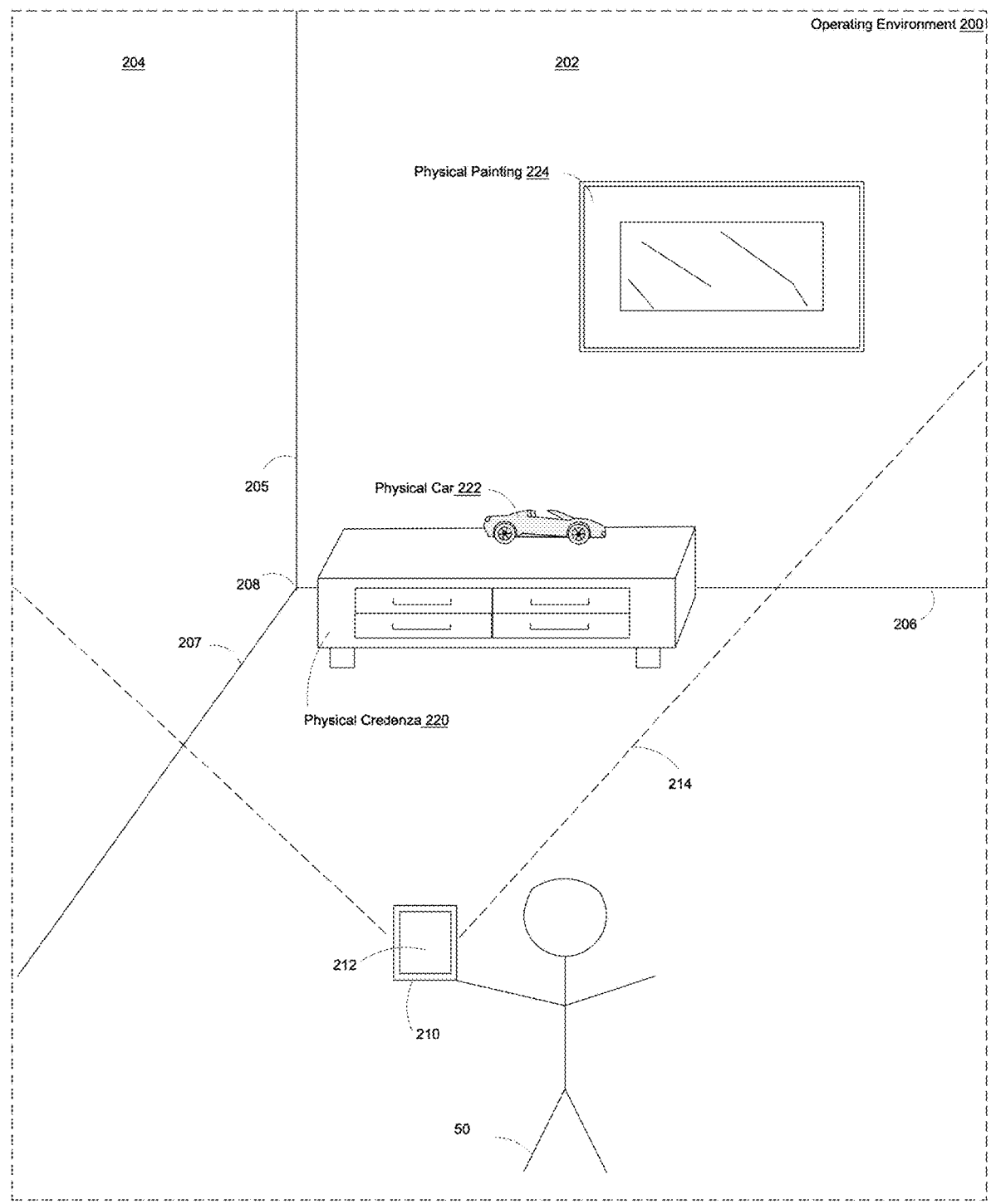
FIGS. 2A-2J are an example of an electronic device displaying a prioritized offscreen indicator in accordance with some implementations.

The electronic device 210 is associated with (e.g., operates according to) an operating environment 200. As illustrated in FIG. 2A, the operating environment 200 includes a first wall 202 and a second wall 204. The first wall 202 includes a first bottom boundary line 206, and the second wall 204 includes a second bottom boundary line 207. The first wall 202 and the second wall 204 share a common boundary line 205. The common boundary line 205 intersects the first bottom boundary line 206 and the second bottom boundary line 207 at a corner point 208. Moreover, the operating environment 200 includes a physical credenza 220, a physical car 222, and a physical painting 224. The electronic device 210 includes a display 212 that is associated with a viewable region 214 of the operating environment 200. The viewable region 214 includes the physical credenza 220, the physical car 222, and the physical painting 224.

In some implementations, the electronic device 210 corresponds to a head-mountable device (HMD) that includes an integrated display (e.g., a built-in display) that displays a representation of the operating environment 200. In some implementations, the electronic device 210 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 210). For example, in some implementations, the electronic device 210 slides/snaps into or otherwise attaches to the head-mountable enclosure. In some implementations, the display of the device attached to the head-mountable enclosure presents (e.g., displays) the representation of the operating environment 200. For example, in some implementations, the electronic device 210 corresponds to a mobile phone that can be attached to the head-mountable enclosure.

In some implementations, the electronic device 210 includes an image sensor, such as a scene camera. For example, the image sensor obtains image data that characterizes the operating environment 200, and the electronic device 210 composites the image data with computer-generated content in order to generate display data for display on the display 212. The display data may be characterized by an XR environment. For example, the image sensor obtains image data that represents the physical objects (220, 222, and 224), and the generated display data includes respective representations of the physical objects (See FIG. 2B).

In some implementations, the electronic device 210 includes a see-through display. The see-through display permits ambient light from the physical environment through the see-through display, and the representation of the physical environment is a function of the ambient light. For example, the see-through display is a translucent display, such as glasses with optical see-through. In some implementations, the see-through display is an additive display that enables optical see-through of the physical surface, such as an optical HMD (OHMD). For example, unlike purely compositing using a video stream, the additive display is capable of reflecting projected images off of the display while enabling the user to see through the display. In some implementations, the see-through display includes a photochromic lens. The HMD adds computer-generated objects to the ambient light entering the see-through display in order to enable display of the operating environment 200. For example, a see-through display permits ambient light from the operating environment 200 that includes the physical objects (220, 222, and 224), and thus the see-through display 212 displays respective representations of the physical objects (See FIG. 2B).

Figure 2B:
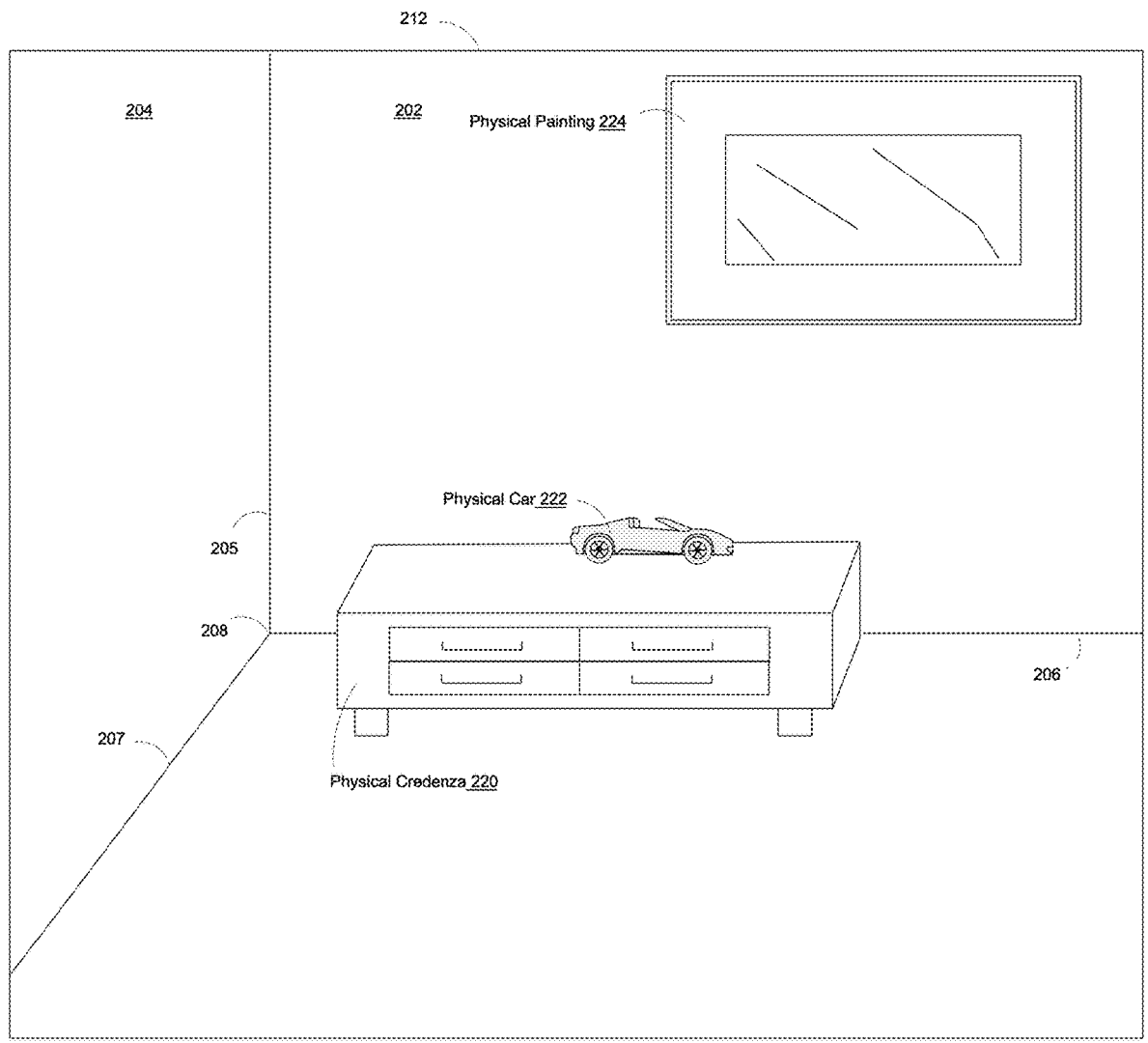

As illustrated in FIG. 2B, the display 212 includes a representation of the first wall 202 and a representation of the second wall 204. Moreover, the display 212 includes a representation of the physical credenza 220, a representation of the physical car 222, and a representation of the physical painting 224. For the sake of clarify and brevity, the "representation of" language is herein sometimes omitted.

Figure 2C:
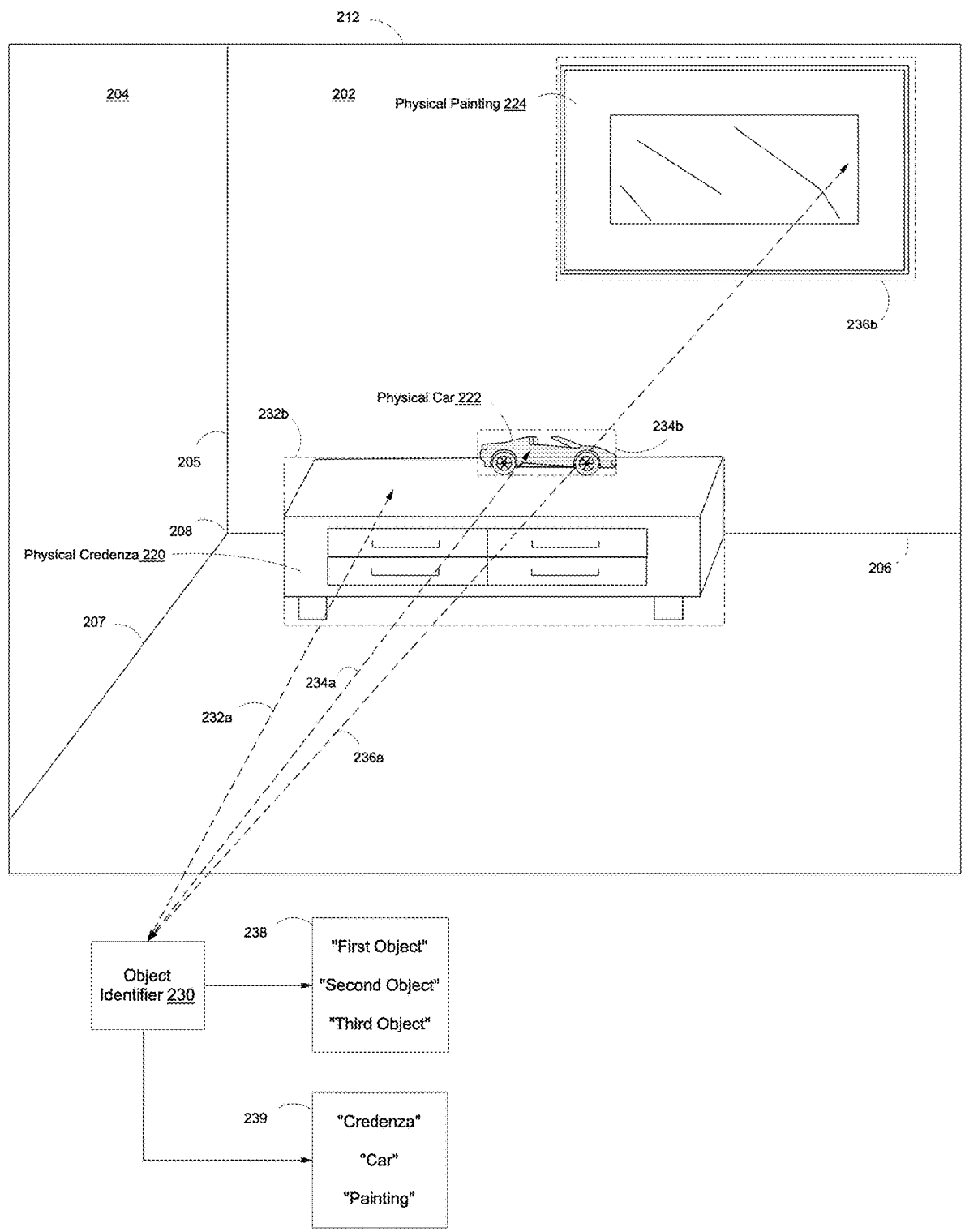

In some implementations, the electronic device 210 performs a computer-vision technique with respect to physical objects included in the operating environment 200 in order to identify and track the physical objects. For example, as illustrated in FIG. 2C, the electronic device 210 includes an object identifier 230 that obtains (e.g., determines) respective object label values associated with the physical credenza 220, the physical car 222, and the physical painting 224. The object identifier 230 performs object identification with respect to the physical credenza 220, as indicated by a first tracking line 232a and a first boundary region 232b. The object identifier 230 performs object identification with respect to the physical car 222, as indicated by a second tracking line 234a and a second boundary region 234b. The object identifier 230 performs object identification with respect to the physical painting 224, as indicated by a third tracking line 236a and a third boundary region 236b. The object identifier 230 may utilize machine learning (e.g., a neural network) in order to track/identify the physical objects.

In some implementations, the object identifier 230 outputs an instance label value corresponding to a physical object. For example, with continued reference to FIG. 2C, the object identifier 230 outputs instance label values 238 including "First Object" corresponding to the physical credenza 220, "Second Object" corresponding to the physical car 222, and "Third Object" corresponding to the physical painting 224. The object identifier 230 may perform instance segmentation in order to determine the instance label values 238.

In some implementations, the object identifier 230 outputs a semantic label value corresponding to a physical object. In contrast to an instance label value, the semantic label value provides an understanding or meaning with respect to the physical object. For example, with continued reference to FIG. 2C, the object identifier 230 outputs semantic label values 239 including "Credenza" corresponding to the physical credenza 220, "Car" corresponding to the physical car 222, and "Painting" corresponding to the physical painting 224. The object identifier 230 may perform semantic segmentation in order to determine the semantic label values 239.

Figure 2D:
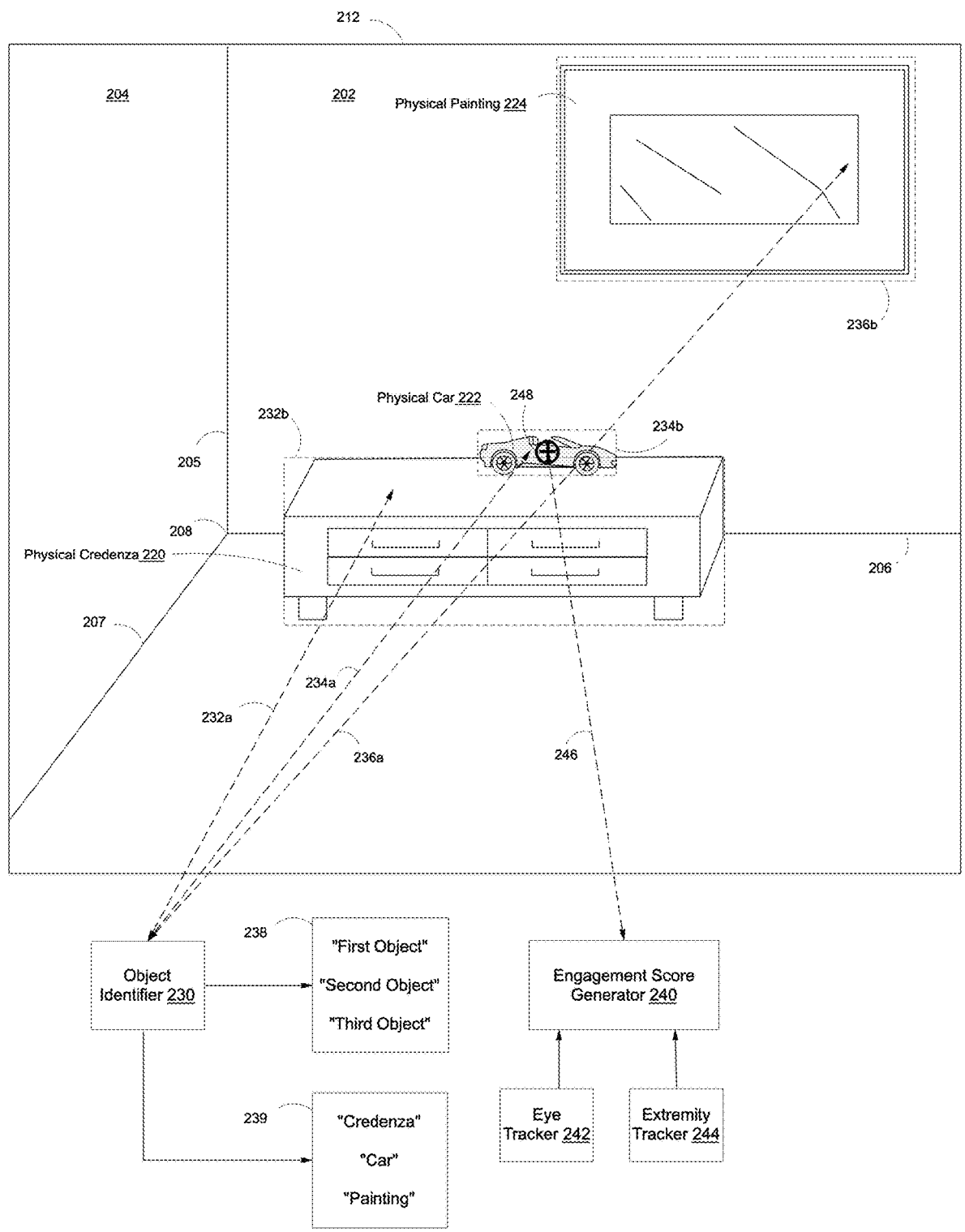
Figure 2E:
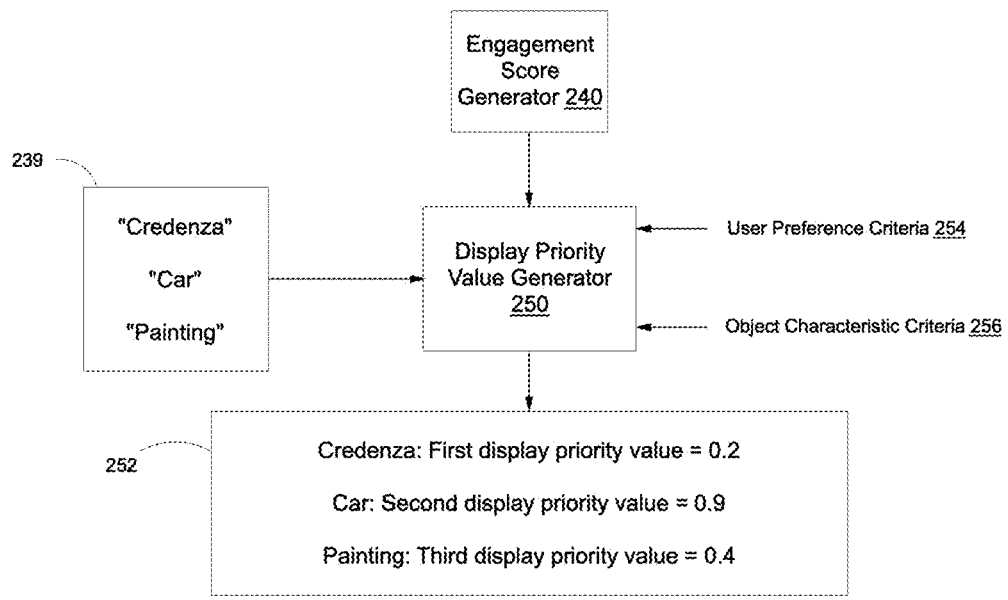

In some implementations, the electronic device 210 determines an engagement score that characterizes a level of user engagement with respect to a particular object, such as a physical object or a computer-generated object. For example, as illustrated in FIG. 2D, the electronic device 210 includes an engagement score generator 240 that determines an engagement score that characterizes a level of engagement of the user 50 with respect to the physical car 222. The engagement score generator 240 tracks the user engagement, as is indicated by engagement tracking line 246, in order to determine that the user engagement is focused on the reticle 248 within the physical car 222. Accordingly, the engagement score generator 240 may assign a relatively high engagement score to the physical car 222. The engagement tracking line 246 and the reticle 248 are illustrated for purely explanatory purposes.

In some implementations, the engagement score generator 240 obtains, from an eye tracker 242, eye tracking data associated with the user 50. Based on the eye tracking data, the engagement score generator determines that the gaze of the user 50 is focused on the reticle 248. For example, the eye tracker 242 includes the eye tracking sensor(s) 164 and the eye tracking controller 160 in FIG. 1. In some implementations, the engagement score generator 240 utilizes label values from the object identifier 230, in combination with the eye tracking data, in order to determine a point or region within the operating environment 200 on which the gaze of the user 50 is focused.

In some implementations, the engagement score generator 240 obtains, from an extremity tracker 244, extremity tracking data associated with the user 50. Based on the extremity tracking data, the engagement score generator determines an extremity of the user 50 spatially corresponds to the reticle 248. For example, the extremity tracker 244 includes the extremity tracking sensor 150 and the extremity tracking sensing controller 180 in FIG. 1. In some implementations, the engagement score generator 240 utilizes label values from the object identifier 230, in combination with the extremity tracking data, in order to determine a point or region within the operating environment 200 on which the extremity of the user 50 is spatially directed.

In some implementations, the engagement score generator 240 utilizes a combination of eye tracking data and extremity tracking data in order to determine an engagement score. In some implementations, the engagement score generator 240 determines multiple engagement scores, such as a first engagement score associated with the physical car 222, and a second engagement score associated with the physical painting 224.

According to various implementations, the electronic device 210 prioritizes a portion of a plurality of objects with respect to each other. The prioritization affects whether or not the electronic device 210 displays an offscreen indicator associated with a particular object when the particular object satisfies an offscreen criterion, as will be described below. For example, as illustrated in box 252 in FIG. 2E, the electronic device 210 includes a display priority value generator 250 that determines a first display priority value of 0.2 associated with the physical credenza 220, a second display priority value of 0.9 associated with the physical car 222, and a third display priority value of 0.4 associated with the physical painting 224.

In some implementations, a display priority value of a particular object is a function of a corresponding engagement score. For example, with reference to FIG. 2D, because the engagement score is relatively high for the physical car 222, the display priority value generator 250 determines that the second display priority value is also relatively high (0.9), as compared with the first display priority value (0.2) and the third display priority value (0.4).

Referring back to FIG. 2E, in some implementations, a display priority value of a particular object is a function of a combination of a corresponding one of the semantic label values 239, one or more user preference criteria 254, and/or one or more object characteristic criteria 256. For example, the electronic device 210 receives a user input (e.g., via a keyboard device) specifying that the user preference criteria 254 include "artwork," "mural," and "picture". Continuing with this example, the display priority value generator 250 determines that the semantic label value of "Painting" is more likely to satisfy the user preference criteria 254 than is the semantic label value of "Credenza". Accordingly, the display priority value generator 250 sets the third display priority value (0.4) associated with the physical painting 224 as higher than the first display priority value (0.2) associated with the physical credenza 220. As another example, the object characteristic criteria 256 include active object types, such as people, animals, machines, etc. Continuing with this example, the display priority value generator 250 sets the second display priority value associated with the physical car 222 to a relatively high value (0.9), because the physical car 222 is an active (e.g., mobile) object, whereas the physical credenza 220 and the physical painting 224 are not active objects.

Accordingly, the electronic device 210 prioritizes the physical car 222 over the physical credenza 220 and over the physical painting 224. In some implementations, the electronic device 210 prioritizes the physical car 222 based on the second display priority value associated with the physical car 222, independent of the first and third display priority values. For example, the electronic device 210 prioritizes the physical car 222 based on the second display priority value of 0.9 exceeding a priority threshold value of 0.5. In some implementations, the electronic device 210 prioritizes based on relative display priority values. For example, the electronic device 210 prioritizes the physical car 222 because the second display priority value (0.9) associated with the physical car 222 is higher than the first display priority value (0.2) and the third display priority value (0.4).

Figure 2F:
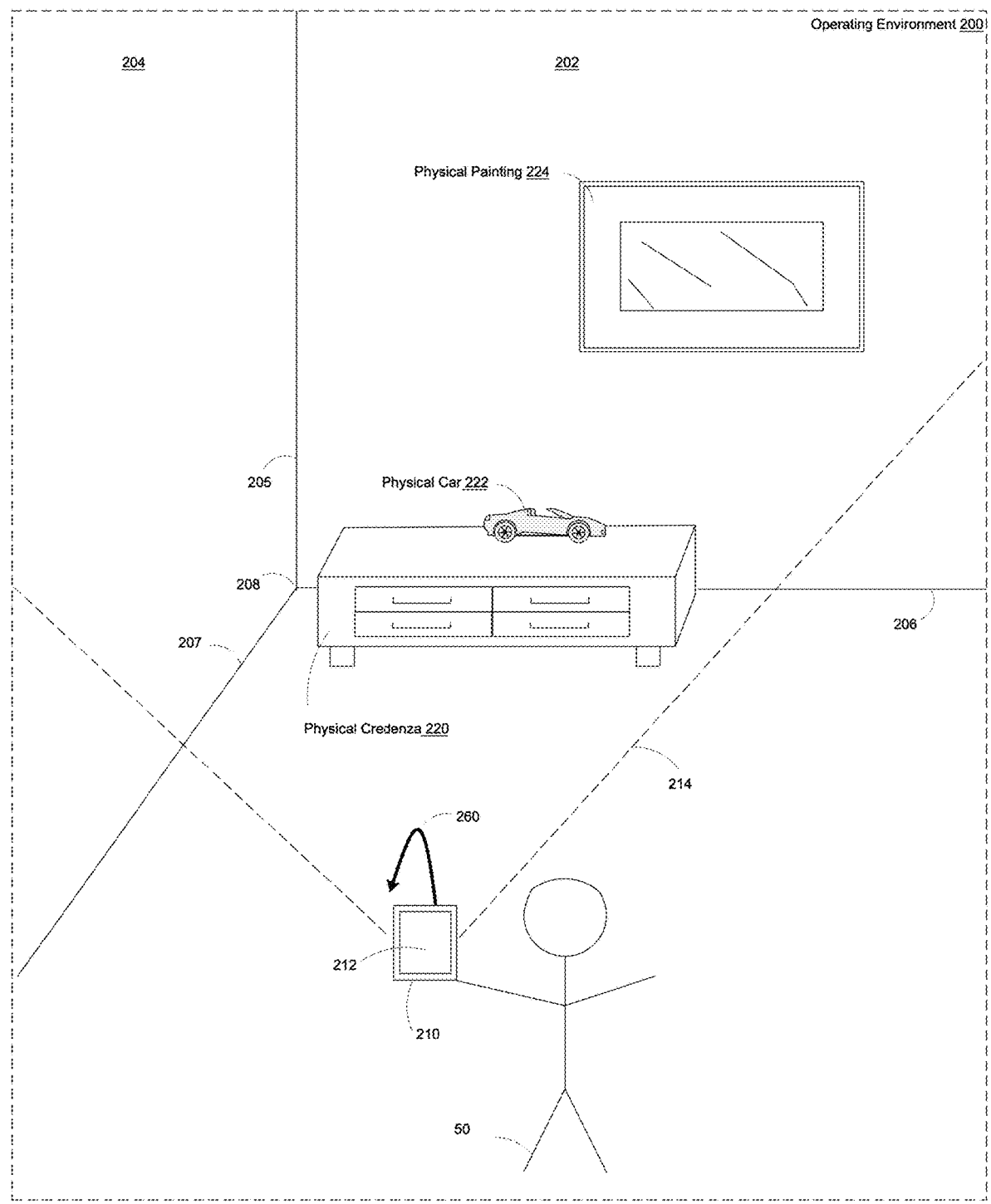

As illustrated in FIG. 2F, the electronic device 210 detects (e.g., via an IMU) a first positional change input 260. The first positional change input 260 corresponds to a downwards and leftwards positional change of the electronic device 210. The downwards positional change is towards the ground on which the user 50 is standing, and the leftwards positional change is towards the second wall 204. As the electronic device 210 changes position, the viewable region 214 associated with the display 212 correspondingly changes. Changes to the display 212 are illustrated in FIGS. 2G and 2H.

Figure 2G:
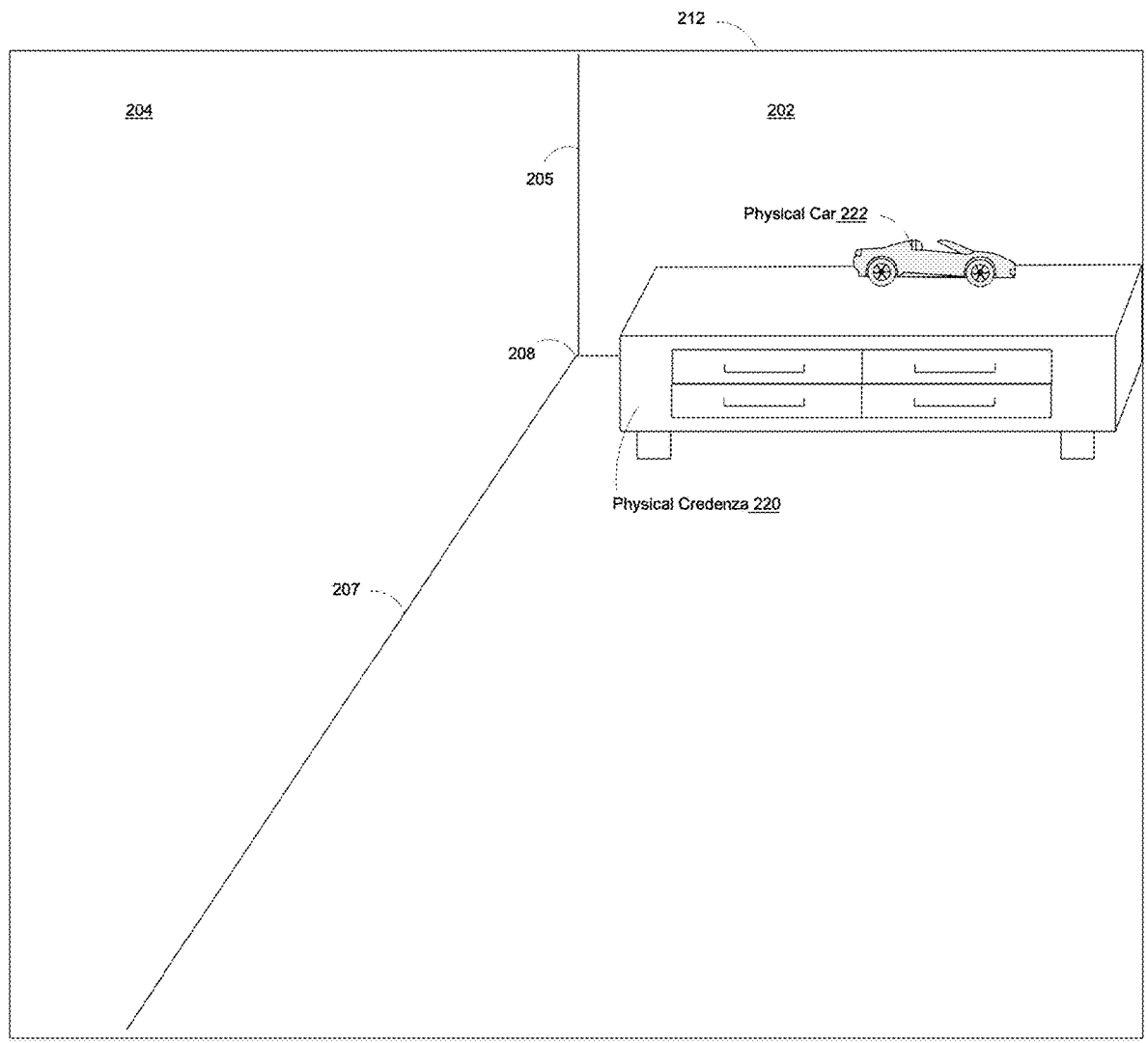

As illustrated in FIG. 2G, as the electronic device 210 moves closer towards the second wall 204 and to the ground, the electronic device 210 ceases to present, on the display 212, the physical painting 224. In some implementations, because the physical painting 224 is no longer presented on the display 212, the physical painting 224 satisfies an offscreen criterion. In some implementations, as illustrated in FIG. 2G, the electronic device 210 foregoes displaying an offscreen indicator associated with the physical painting 224 because the electronic device 210 prioritized the physical car 222 over the physical painting 224.

Figure 2H:
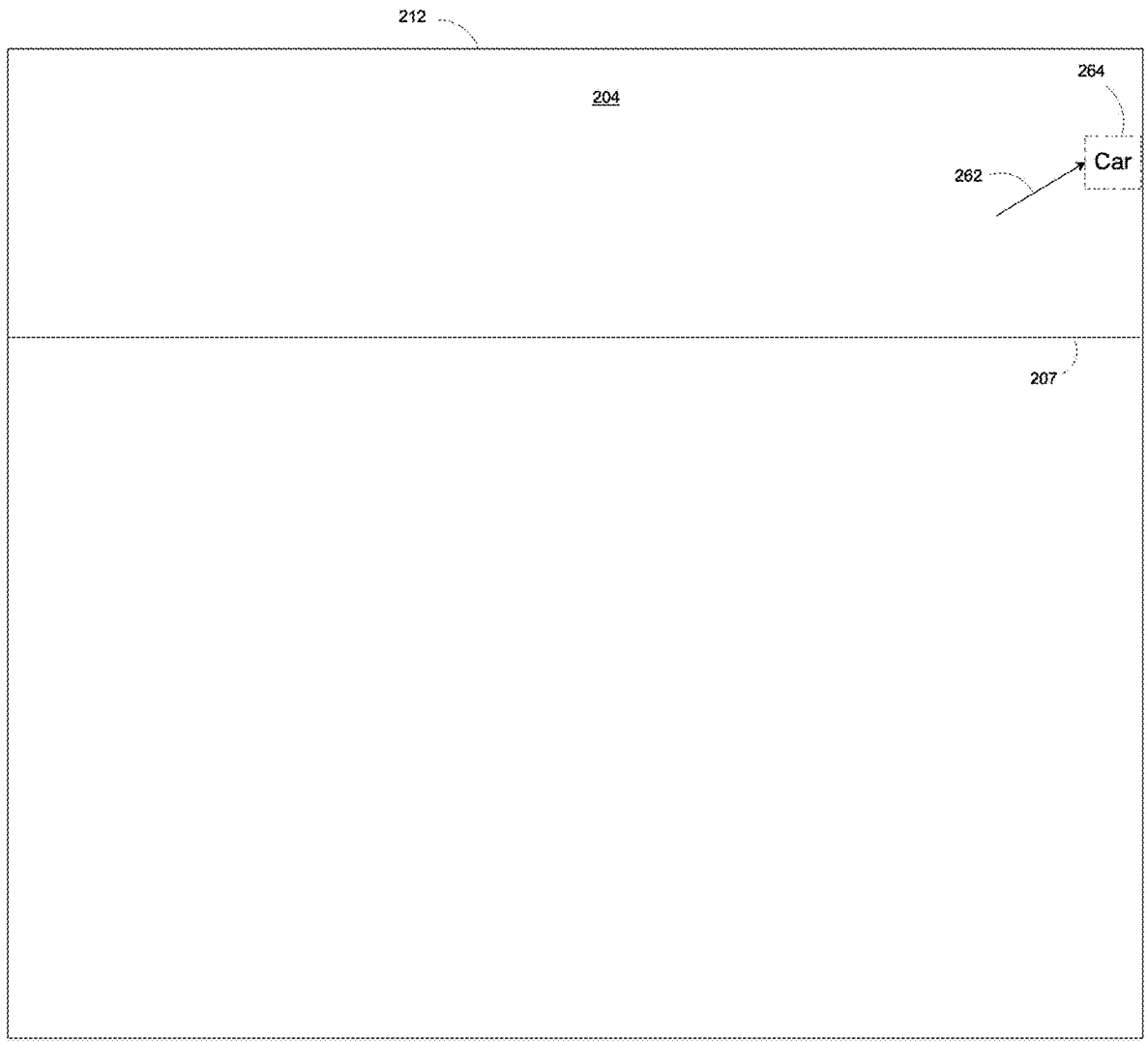

Upon completion of the first positional change input 260, the electronic device 210 presents the second wall 204 (including the second bottom boundary line 207), but ceases to present the first wall 202, as illustrated in FIG. 2H. Moreover, the electronic device 210 ceases to present the physical credenza 220 and the physical car 222. Because the physical credenza 220 and the physical car 222 are no longer presented on the display 212, each of the physical credenza 220 and the physical car 222 satisfies the offscreen criterion.

The electronic device 210 displays, on the display 212, a first offscreen indicator associated with the physical car 222, but foregoes displaying an offscreen indicator associated with the physical credenza 220, because of the prioritization of the physical car 222 over the physical credenza 220. In some implementations, as illustrated in FIG. 2H, the first offscreen indicator includes an arrow indicator 262 and an object indicator 264. The arrow indicator 262 may be associated with an angular characteristic that is a function of the last-displayed position of the physical car 222 on the display 212. The angular characteristic corresponds to an upwards and rightwards angle of the arrow indicator 262, which is the opposite of the downwards and leftwards positional change of the electronic device 210 that caused the physical car 222 to move offscreen. The object indicator 264 may include a textual indicator corresponding to "Car". One of ordinary skill in the art will appreciate that, in some implementations, the object indicator 264 has different visual characteristics. For example, the object indicator 264 may include an image (e.g., an icon) representing a car, in addition to or instead of the textual indicator.

Figure 2I:
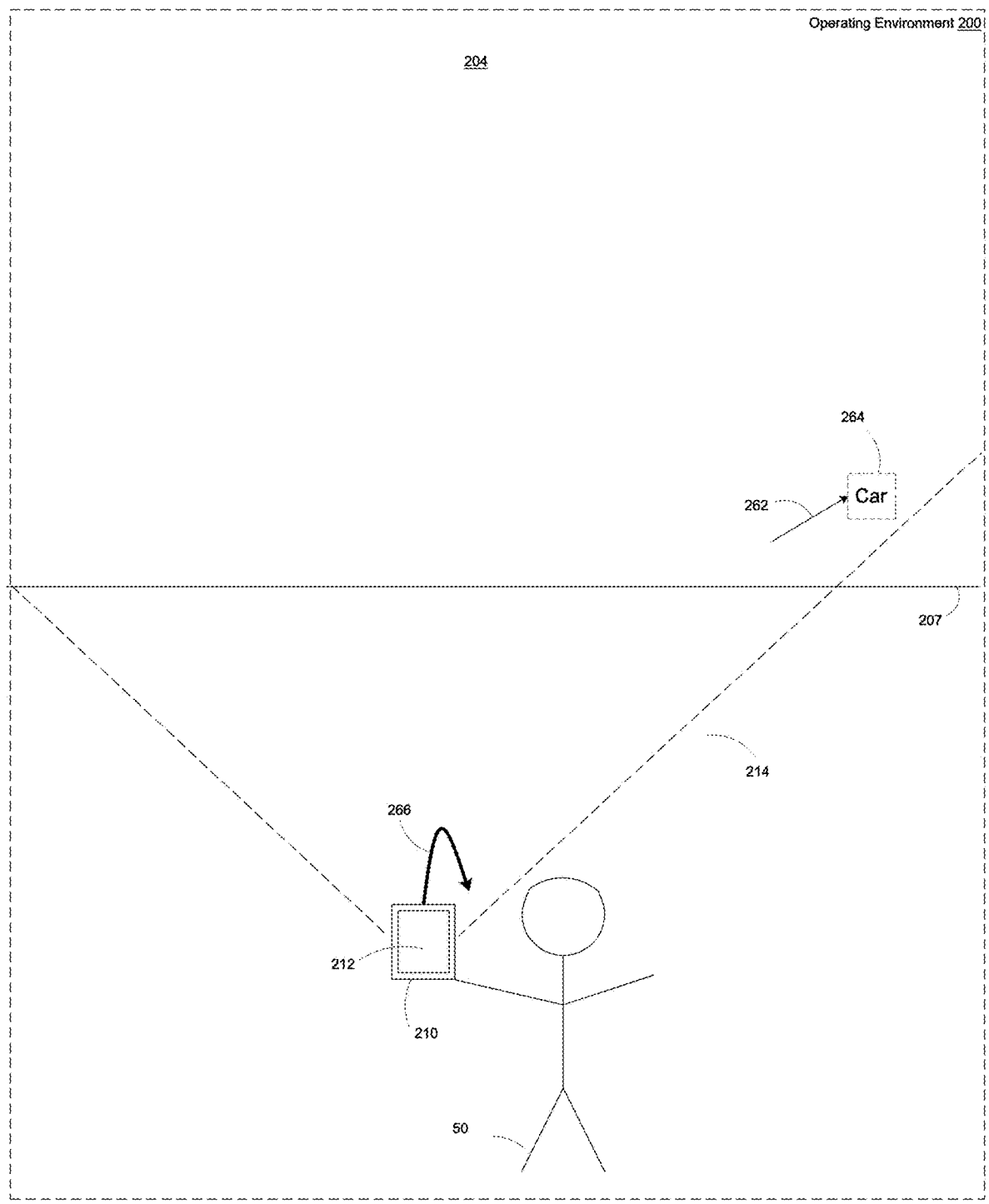
Figure 2J:
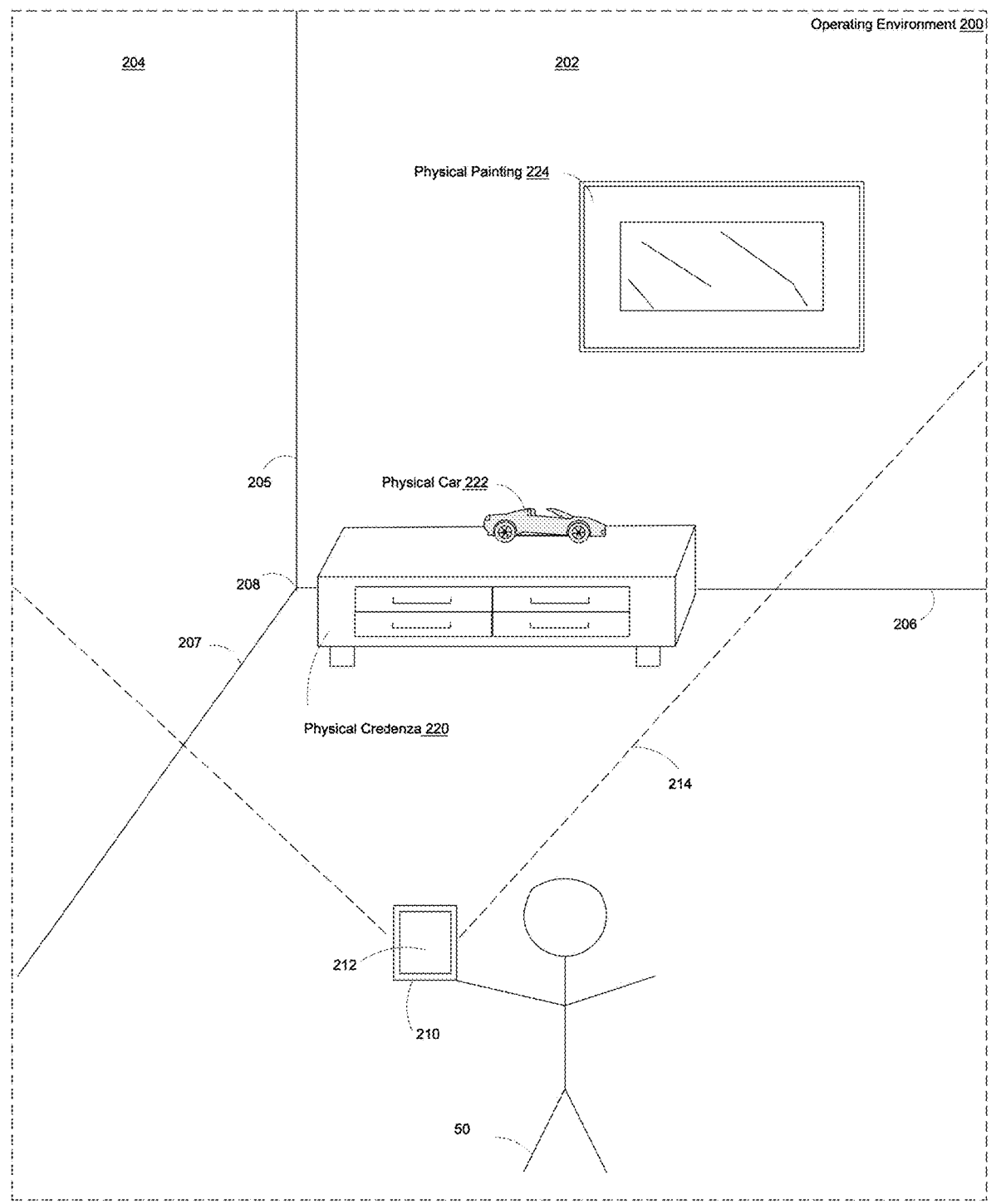

As illustrated in FIG. 2I, the electronic device 210 detects a second positional change input 266. The second positional change input 266 corresponds to an upwards and rightwards positional change of the electronic device 210. Based on the second positional change input 266, the viewable region 214 is restored to the previous position with respect to the operating environment 200 (before detection of the first positional change input 260). Accordingly, as illustrated in FIG. 2J, the viewable region 214 associated with the display 212 includes the physical credenza 220, the physical car 222, and the physical painting 224. Because the physical car 222 is again within the viewable region 214, the display 212 no longer includes the first offscreen indicator.

FIGS. 3A-3E are another example of the electronic device 210 displaying a prioritized offscreen indicator in accordance with some implementations. Namely, the electronic device 210 displays a second offscreen indicator associated with a computer-generated object, which is in contrast to the physical object (the physical car 222) associated with first offscreen indicator illustrated in FIG. 2A-2J. One of ordinary skill in the art will appreciate that, in some implementations, the electronic device 210 prioritizes and displays offscreen indicator(s) for a combination of one or more computer-generated objects and one or more physical objects.

Figure 3A:
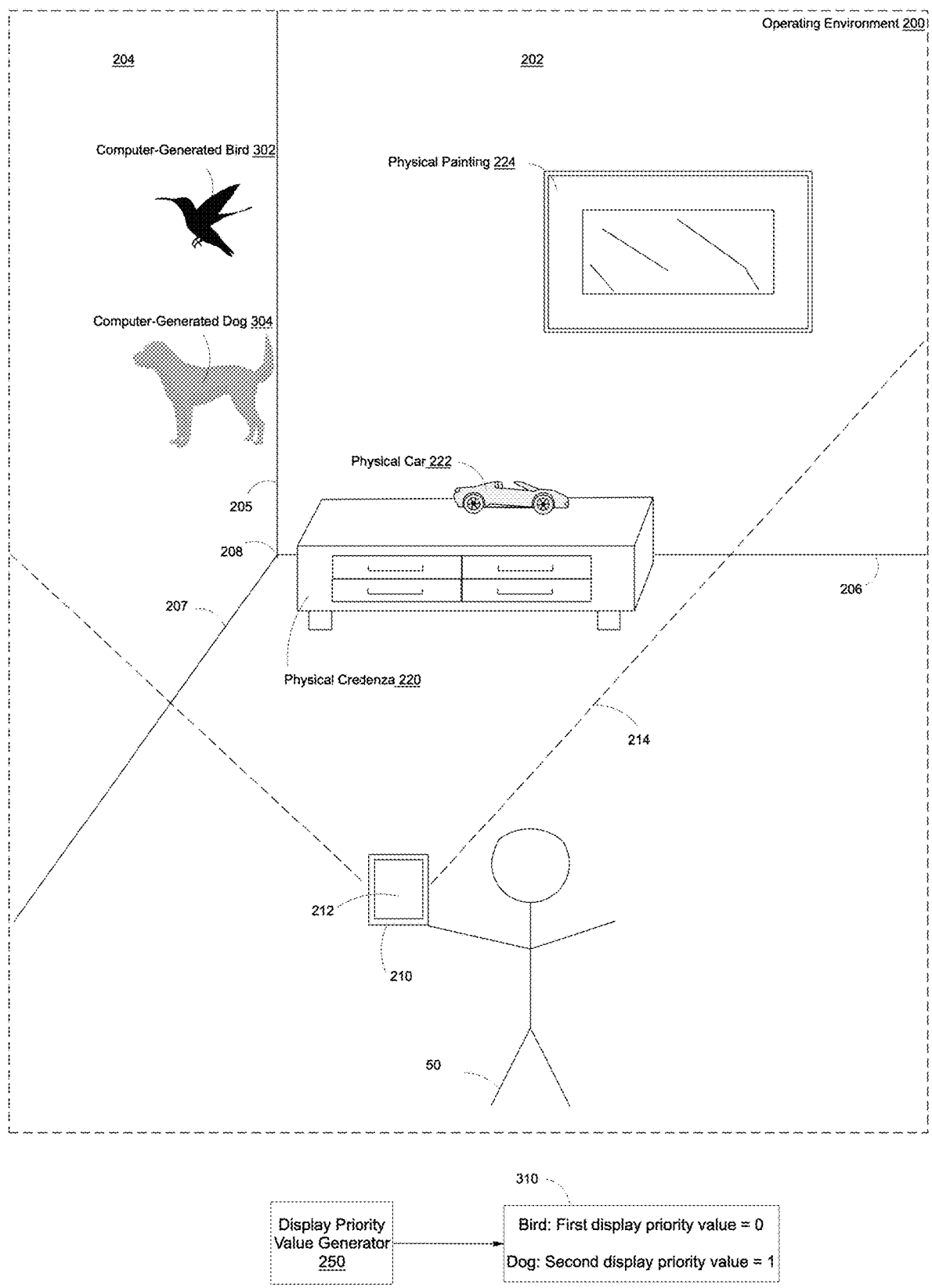
FIGS. 3A-3E are another example of an electronic device displaying a prioritized offscreen indicator in accordance with some implementations.

As illustrated in FIG. 3A, the electronic device 210 presents, on the display 212, a computer-generated bird 302 and a computer-generated dog 304 (e.g., a floating dog). The computer-generated bird 302 and the computer-generated dog 304 are spatially associated with the second wall 204 of the operating environment 200. Moreover, the display value generator 250 has prioritized the computer-generated dog 304 over the computer-generated bird 302. For example, as is indicated in box 310, the computer-generated bird 302 is associated with a first display priority value of "0", whereas the computer-generated dog 304 is associated with a second display priority value of "1." Prioritization can occur based on a variety of techniques, such as based on function of a combination of engagement score(s), user profile criteria, and/or object characteristic criteria.

Figure 3B:
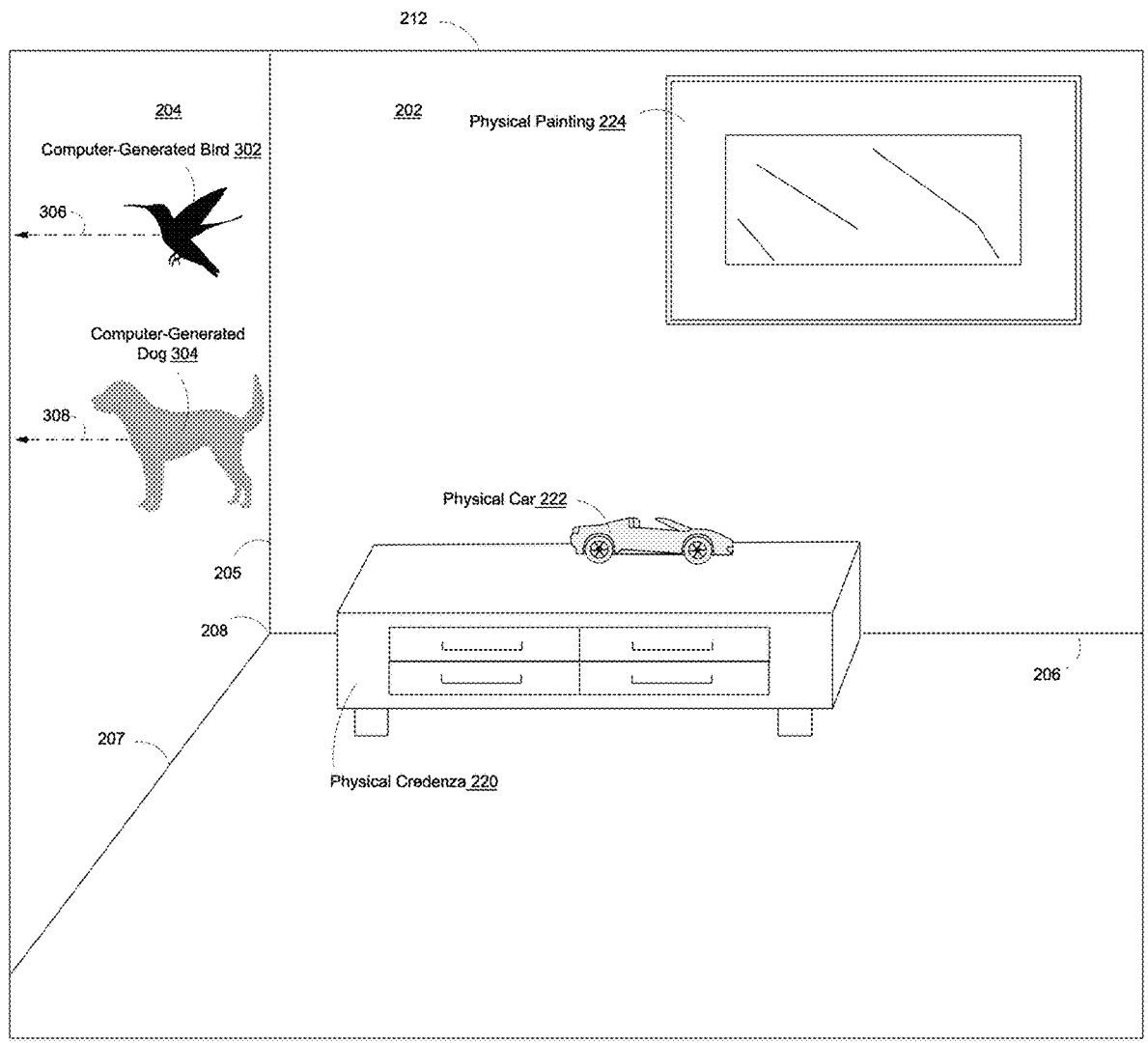

As illustrated in FIG. 3B, each of the computer-generated bird 302 and the computer-generated dog 304 is associated with a respective animation that moves leftwards towards the left edge of the display 212. In particular, the computer-generated bird 302 is associated with a first animation, which is indicated by a first animation line 306 (illustrated for purely explanatory purposes). Moreover, the computer-generated dog 304 is associated with a second animation, which is indicated by a second animation line 308 (illustrated for purely explanatory purposes).

Figure 3C:
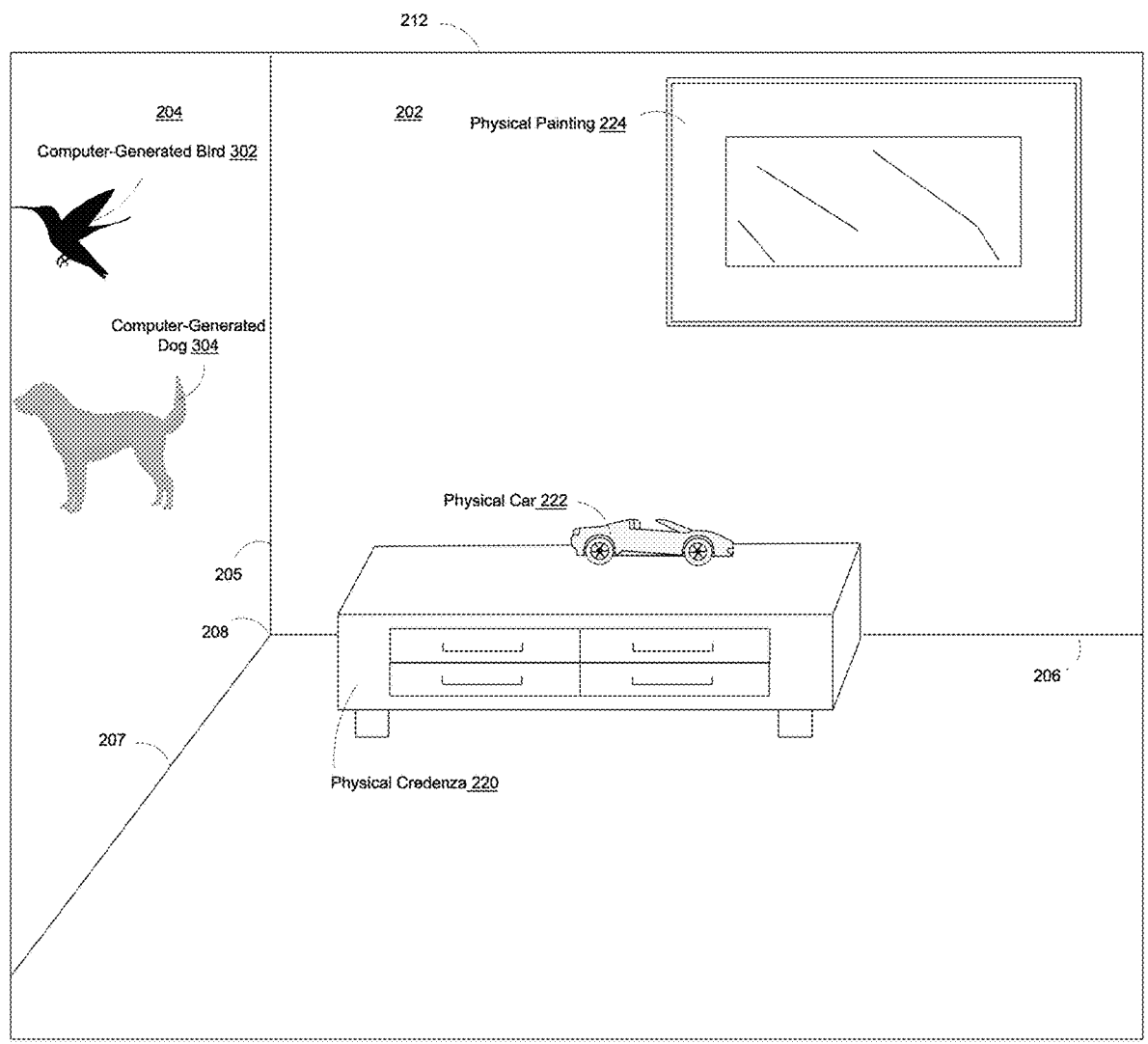

As illustrated in FIG. 3C, based on the first animation and the second animation, each of the computer-generated bird 302 and the computer-generated dog 304 moves nearer to the left edge of the display 212. In some implementations, based on a particular object satisfying a proximity threshold with respect to an edge of the display 212, the electronic device 210 determines that the particular object satisfies an offscreen criterion. For example, the electronic device 210 determines that the computer-generated dog 304 satisfies the offscreen criterion when the leftmost portion of the computer-generated dog 304 (e.g., the dog's nose) is less than a threshold distance from the left edge of the display 212. In some implementations, the electronic device 210 determines that a particular object satisfies the offscreen criterion when the display 212 ceases to include a portion of (e.g., less than the entirety of) the particular object or the entirety of the particular object. For example, as illustrated in FIG. 3D, the electronic device 210 determines that the computer-generated bird 302 satisfies the offscreen criterion based on display 212 ceasing to include the leftmost portion of the computer-generated bird 302 (e.g., the bird's beak).

Figure 3D:
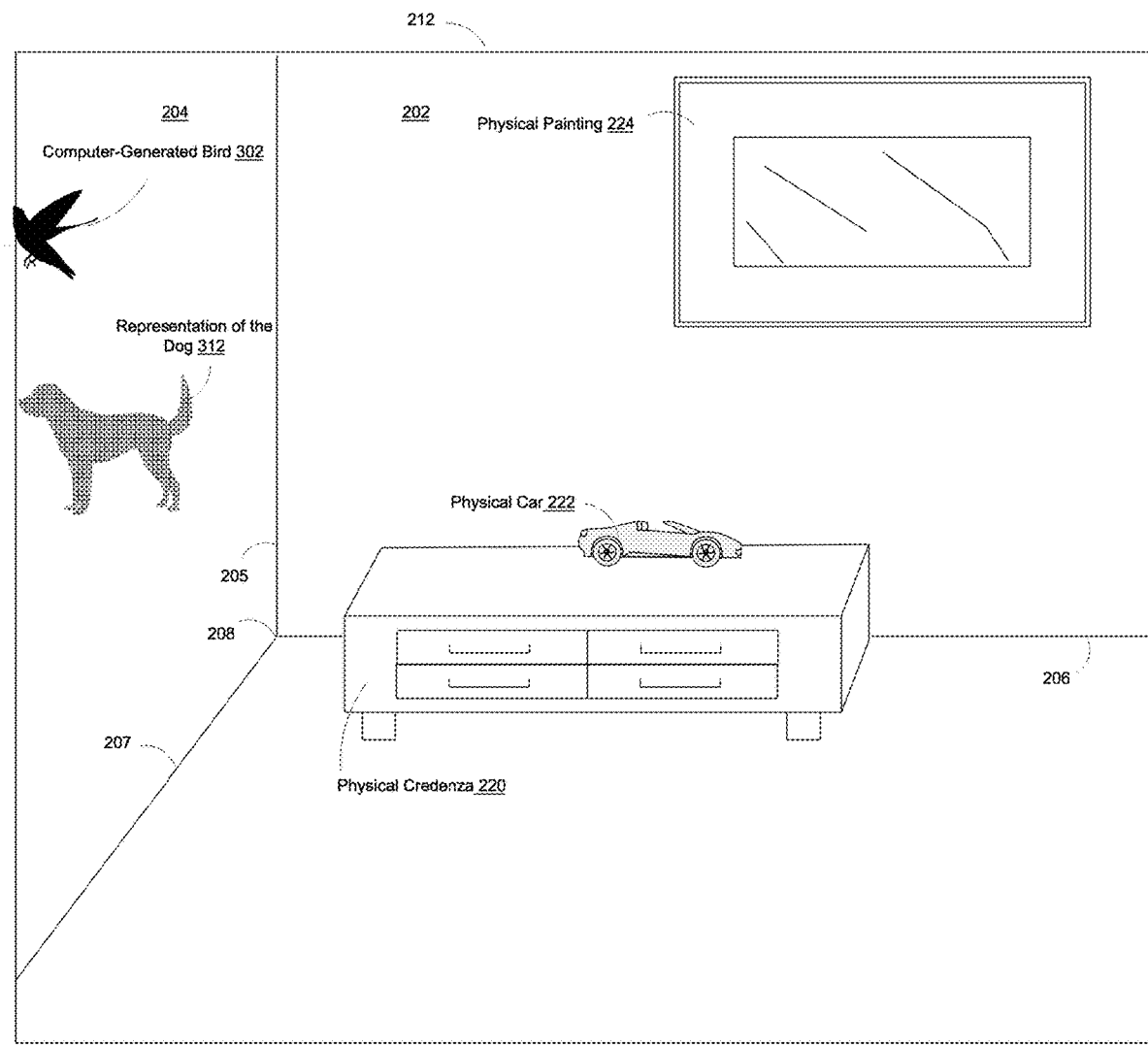

As illustrated in FIG. 3D, in response to determining that the computer-generated bird 302 satisfies the offscreen criterion, the electronic device 210 foregoes displaying, on the display 212, an offscreen indicator associated with the computer-generated bird 302 according to the prioritization of the computer-generated dog 304 over the computer-generated bird 302. On the other hand, in response to determining that the computer-generated dog 302 satisfies the offscreen criterion, the electronic device 210 displays, on the display 212, a second offscreen indicator that is associated with the computer-generated dog 304.

Figure 3E:
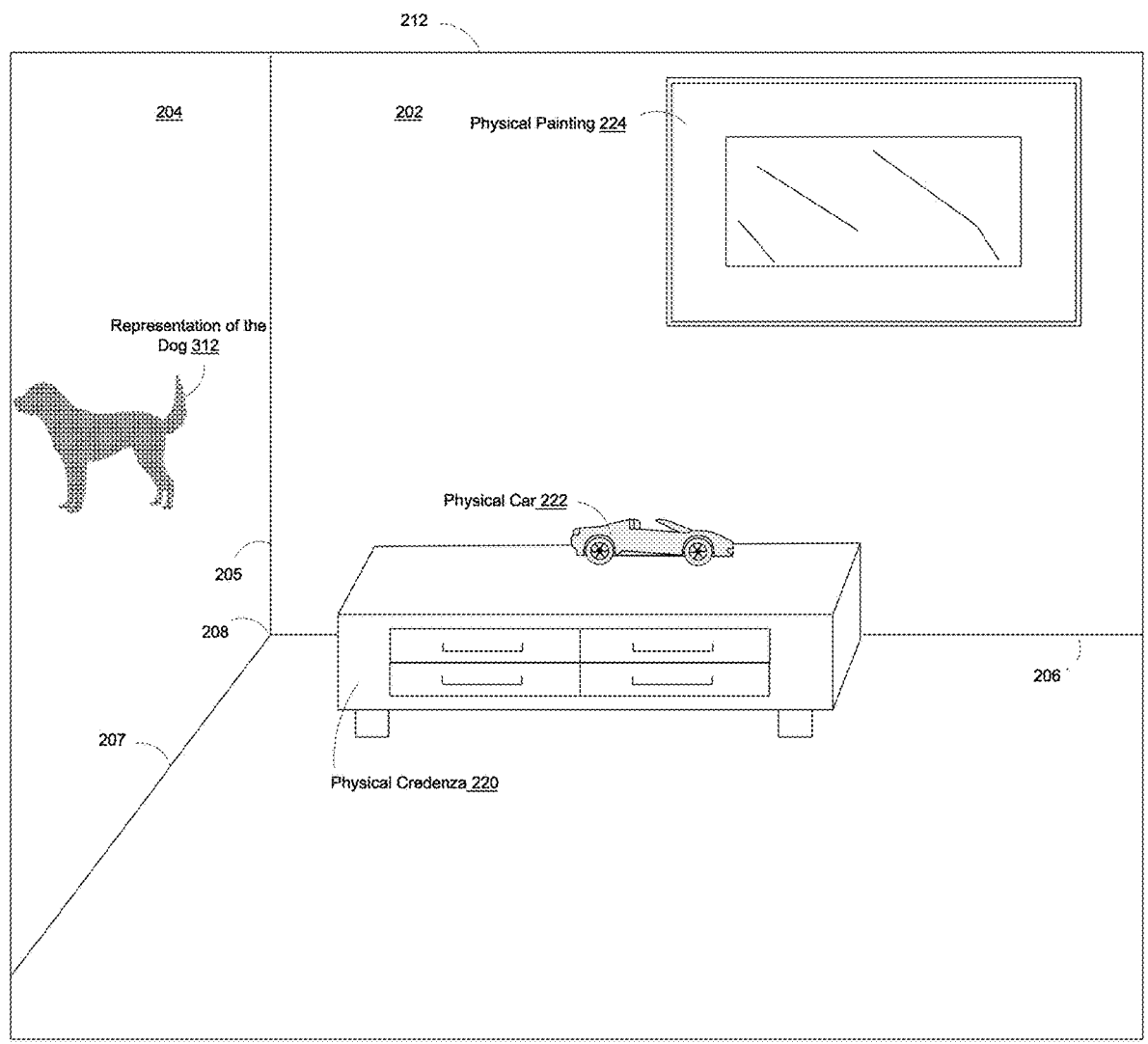

The second offscreen indicator may be displayed at the last-displayed position of the computer-generated dog 304 on the display 212. In some implementations, the electronic device 210 replaces the computer-generated dog 302 with the second offscreen indicator when the computer-generated dog 302 satisfies the offscreen criterion. For example, as illustrated in FIG. 3D, the second offscreen indicator corresponds to a representation of the dog 312. The representation of the dog 312 may correspond to a computer-generated dog having a different color, as is indicated by a dog including a different pattern, as illustrated in FIG. 3D. As another example, the representation of the dog 312 corresponds to an outline of a dog. Accordingly, in some implementations, the electronic device 210 produces a bumper effect, in which the electronic device 210 replaces the computer-generated dog 302 with the representation of the dog 312 in order to give the impression that the computer-generated dog 302 did not leave the display 212. As illustrated in FIG. 3E, upon completion of the first and second animations, the display 212 ceases to include the computer-generated bird 302, but continues to include the representation of the dog 312.

Figure 4:
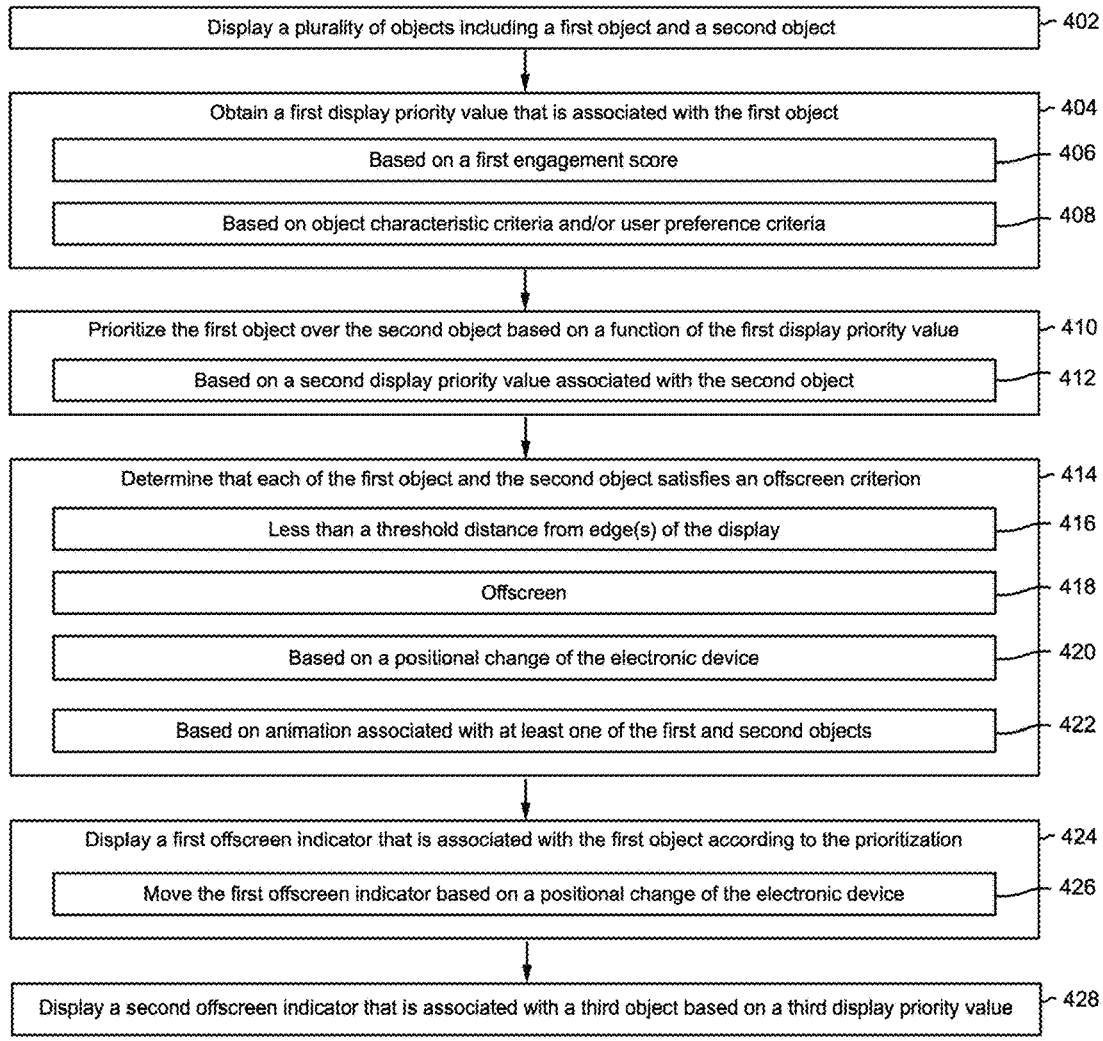
FIG. 4 is an example of a flow diagram of a method of displaying one or more prioritized offscreen indicators in accordance with some implementations.

FIG. 4 is an example of a flow diagram of a method 400 of displaying one or more prioritized offscreen indicators in accordance with some implementations. In various implementations, the method 400 or portions thereof is performed by an electronic device, such as the electronic device 100 in FIG. 1 or the electronic device 210 in FIG. 2A-2J or 3A-3E. In various implementations, the method 400 or portions thereof is performed by a head-mountable device (HMD). In some implementations, the method 400 is performed by processing logic, including hardware, firmware, software, or a combination thereof. In some implementations, the method 400 is performed by a processor executing code stored in a non-transitory computer-readable medium (e.g., a memory). In various implementations, some operations in method 400 are, optionally, combined and/or the order of some operations is, optionally, changed.

As represented by block 402, the method 400 includes presenting, on a display, a plurality of objects including a first object and a second object. In various implementations, the plurality of objects includes a combination of computer-generated object(s) and representation(s) of physical objects. As one example, with reference to FIG. 3B, the electronic device 210 presents respective representations of the physical credenza 220, the physical car 222, and the physical painting 224, and presents the computer-generated bird 302 and the computer-generated dog 304.

As represented by block 404, while presenting the plurality of objects, the method 400 includes obtaining a first display priority value that is associated with the first object. For example, with reference to FIG. 2E, the display priority value generator 250 determines the second display priority value of 0.9 that is associated with the physical car 222. As another example, with reference to FIG. 3A, the display priority value generator 250 determines the second display priority value of 1 that is associated with the computer-generated dog 304.

As represented by block 406, in some implementations, obtaining the first display priority value includes determining a first engagement score that characterizes a level of user engagement with respect to the first object. A particular engagement score characterizes the extent to which the user is focused on a corresponding object. For example, an engagement score is higher when the user's eye gaze is directed to an object than when the object is in the user's peripheral vision. As one example, with reference to FIGS. 2D and 2E, the engagement score generator 240 determines a relatively high engagement score associated with the physical car 222, based on eye tracking data and/or extremity data indicating a correspondingly high level of user engagement with respect to the physical car 222. As another example, the engagement score generator 240 determines, based on the eye tracking data, that the user 50 is gazing at the physical car 222 (as indicated by the reticle 248) for more than a threshold amount of time. As yet another example, the engagement score generator 240 determines, based on the extremity tracking data, that an extremity of the user 50 is spatially proximate to the physical car 222 (as indicated by the reticle 248) for more than a threshold amount of time. In some implementations, determining the first engagement score is based on eye tracking data that is indicative of a gaze position. To that end, in some implementations, the method 400 includes determining a spatial relationship between the gaze position and the first object. In some implementations, determining the first engagement score is based on extremity tracking data that is indicative of an extremity position. To that end, in some implementations, the method 400 includes determining a spatial relationship between the extremity position and the first object. For example, the extremity tracking data is generated by a computer-vision system that is configured to identify an extremity of a user. As another example, the extremity tracking data is from an auxiliary device (e.g., a stylus or controller) that is communicatively coupled to an electronic device.

As represented by block 408, In some implementations, the first display priority value is based on a function of one or more object characteristic criteria and/or one or more user preference criteria.

To that end, in some implementations, the method 400 includes obtaining one or more object characteristic criteria, and determining the first display priority value based on a function of the first object and the one or more object characteristic criteria. For example, the one or more object characteristic criteria include an object importance criterion, such as a particular object type or class that is relevant to a user, based on the user's profile. As another example, particular object characteristic criterion indicates a football when a popular football game is being broadcast. As yet another example, a particular object characteristic criterion indicates a computer-generated object or a physical object. In some implementations, the method 400 includes comparing a particular object characteristic criterion against a corresponding characteristic of the first object. For example, the first display priority value is relatively high when a particular object characteristic criterion indicates a "living" object, and the first object is a living object (e.g., a person, animal, etc.). As another example, with reference to FIG. 2E, a particular object characteristic criterion 256 indicates an active object. Accordingly, the display priority value generator 250 determines the second display priority value of 0.9 for the physical car 222 because a car is generally an active (e.g., mobile) object. The second display priority value is higher than first and third display priority values of 0.2 and 0.4 respectively associated with the physical credenza 220 and the physical painting 224, both of which are non-active objects.

In some implementations, the method 400 includes obtaining one or more user preference criteria, and determining the first display priority value based on a function of the first object and the one or more user preference criteria. In some implementations, an electronic device receives the user preference criteria via a secondary (e.g., auxiliary) user input device, such as a controller device, a keyboard input device, or a stylus input device. In some implementations, an electronic device receives the user preference criteria via an untethered input system, such as via an extremity tracker, eye tracker, speech recognition system, etc. For example, an electronic device detects user speech (e.g., via a microphone) specifying an object type, identifies the object type using a speech recognition system, and the electronic device assigns relatively high respective display priority values to a subset of the plurality of objects of the object type. As one example, with reference to FIG. 3A, a particular user preference criterion indicates a quadruped. Accordingly, the display priority value generator 250 determines the second display priority value of 1.0 associated the computer-generated dog 304, because a dog is a quadruped animal. The second display priority value is higher than the first display priority value of 0.0 associated with the computer-generated bird 302, which is not a quadruped animal.

As represented by block 410, while presenting the plurality of objects, the method 400 includes prioritizing the first object over the second object based on a function of the first display priority value. For example, prioritizing includes selecting the first object, but not selecting the second object. In some implementations, prioritizing the first object is based on the first display priority value exceeding a priority threshold value. For example, with reference to FIG. 2E, the electronic device 210 prioritizes the physical car 222 over the physical credenza 220 and the physical painting 224, because the second display priority value associated with the physical car 222 exceeds a priority threshold value of 0.5.

As represented by block 412, in some implementations, the method 400 includes, while presenting the plurality of objects, obtaining a second display priority value that is associated with the second object. For example, the second display priority value is based on a second engagement score that characterizes a level of user engagement with respect to the second object. In some implementations, prioritizing the first object over the second object is based on a function of the second display priority value. For example, prioritizing the first object over the second object includes determining that the first display priority value is higher than the second display priority value. As one example, with reference to FIG. 3A, the electronic device 210 prioritizes the computer-generated dog 304 over the computer-generated bird 302 because the second display priority value of 1 associated with the computer-generated dog 304 is larger than the first display priority value of 0 associated with the computer-generated dog bird 302.

In some implementations, the method 400 includes prioritizing a first subset of the plurality of objects over a second subset of the plurality of objects. For example, each of the first subset of the plurality of objects is associated with a corresponding display priority value that exceeds the priority threshold, and each of the second subset of the plurality of objects is associated with a corresponding display priority value that does not exceed the display priority threshold.

As represented by block 414, the method 400 includes determining that each of the first object and the second object satisfies an offscreen criterion. In some implementations, a particular object represents a physical object, and the method 400 includes determining that the particular object satisfies the offscreen criterion by performing a computer-vision technique with respect to particular first object. For example, the computer-vision technique includes performing object identification with respect to image data (e.g., instance segmentation or semantic segmentation), optionally with the aid of a neural network. As one example, with reference to FIGS. 2F-2H, while detecting the first positional change input 260, the electronic device 210 uses a computer-vision technique to track the physical credenza 220, the physical car 222, and the physical painting 224. Tracking physical object(s) enables the electronic device 210 to determine when each of the physical object(s) satisfies the offscreen criterion.

As represented by block 416, in some implementations, determining that determining that the first object satisfies the offscreen criterion includes determining that at least a portion of the first object is positioned at less than a threshold distance from a first edge of the display. Moreover, determining that the second object satisfies the offscreen criterion includes determining that at least a portion of the second object is positioned at less than a threshold distance from a second edge of the display. The first edge and the second edge can be the same edge or different edges of the display. As one example, with reference to FIG. 3C, the electronic device 210 determines that the computer-generated bird 302 satisfies the offscreen criterion because the leftward portion (e.g., the beak) of the computer-generated bird 302 is less than a threshold distance from the left edge of the display 212.

As represented by block 418, in some implementations, determining that each of the first object and the second object satisfies the offscreen criterion is in response to ceasing to present the first object and the second object. For example, with reference to FIG. 2H, the electronic device 210 determines that neither the physical credenza 220, the physical car 222, nor the physical painting 224 is within the viewable region 214. Accordingly, the electronic device 210 ceases to present, on the display 212, representations of those physical objects. The electronic device 210 determines that each of the physical credenza 220, the physical car 222, and the physical painting 224 satisfies the offscreen criterion based on the presentation cessation.

As represented by block 420, in some implementations, determining that each of the first object and the second object satisfies the offscreen criterion is based on a positional change of the electronic device, such as described above with reference to the first positional change input 260 illustrated in FIGS. 2F-2H. To that end, in some implementations, the method 400 includes detecting, via an input device, a positional change input that corresponds to a positional change of the electronic device, and determining that at least one of the first object and the second object satisfies the offscreen criterion based on the positional change input. The input device may include a positional sensor, such as an IMU, visual inertial odometry (VIO) sensor, simultaneous localization and mapping (SLAM) sensor, etc.

As represented by block 422, in some implementations, at least one of the first object and the second object corresponds to a respective animation that satisfies the offscreen criterion. The animation is independent of a positional change of the electronic device. For example, with reference to FIG. 3B, the computer-generated dog 304 corresponds to an animation towards the left edge of the display 212, as indicated by the second animation line 308. Continuing with this example, when the computer-generated dog 304 moves close enough to the left edge of the display 212 as illustrated in FIG. 3C, the electronic device 210 determines that the computer-generated dog 304 satisfies the offscreen criterion.

As represented by block 424, in response to determining that each of the first object and the second object satisfies the offscreen criterion, the method 400 includes displaying a first offscreen indicator that is associated with the first object according to the prioritization. The position of the first offscreen indicator may be based on the last-displayed position of the first object on the display. The first offscreen indicator is indicative of an offscreen position of the first object, such as a position of the first object within an environment (e.g., an XR environment). The first offscreen indicator may correspond to one of a dot, reticle, arrow, animation (e.g., flashing object), etc. As one example, the first offscreen indicator is a bumper that is positioned near an edge of the display, wherein the edge is associated with the last-displayed position of the first object. The bumper may be displayed before the display ceases to include the entirety of the first object. In some implementations, in response to determining that each of the first object and the second object satisfies the offscreen criterion, the method 400 includes foregoing display of a respective offscreen indicator associated with the second object according to the prioritization. For example, in response to determining that each of the computer-generated bird 302 and the computer-generated dog 304 satisfies the offscreen criterion in FIG. 3C, the electronic device 210 displays the second offscreen indicator (e.g., the representation of the dog 312) associated with the computer-generated dog 304 in FIGS. 3D and 3E, but foregoes displaying an offscreen indicator associated with the computer-generated bird 302, according to the prioritization (See box 310 in FIG. 3A).

As represented by block 426, in some implementations, while displaying the first offscreen indicator, the method 400 includes detecting, via an input device (e.g., a positional sensor), a positional change input that corresponds to a positional change of the electronic device. Based on the positional change input, the method 400 includes moving the first offscreen indicator to a different position on the display. For example, a first offscreen indicator is displayed proximate to the left edge of the display, slightly below the top-left corner of the display. In response to an upwards (e.g., towards the sky) rotation of the electronic device, the electronic device moves the first offscreen indicator downwards along the left edge of the display, towards the bottom-left corner of the display.

As represented by block 428, in some implementations, the method 400 includes displaying a second offscreen indicator that is associated with a third object, of the plurality of objects, according to a prioritization. To that end, in some implementations, the method 400 includes obtaining a third display priority value that is associated with the third object, and prioritizing the third object over the second object based on a function of the third display priority value. Moreover, in response to determining that the third object satisfies the offscreen criterion, the method 400 includes displaying the second offscreen indicator according to the prioritization. As one example, although not illustrated in FIG. 2G, in some implementations, the electronic device 210 displays a second offscreen indicator that is associated with a physical painting 224, because the third display priority value associated with the physical painting 224 is the second highest value. Continuing with this previous example and with continued reference to FIG. 2G, the electronic device 210 displays the second offscreen indicator near the upper right of the display 212, which corresponds to the last-displayed position of the physical painting 224 on the display 212. In some implementations, the method 400 includes concurrently displaying the first and second offscreen indicators respectively associated with the first and third objects, while foregoing display of an offscreen indicator associated with the second object.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device including one or more processors, a non-transitory memory, and a display:
while presenting, via the display, a plurality of objects including a first object and a second object:
obtaining a first semantic label value associated with the first object;
determining a first display priority value that is associated with the first object, wherein determining the first display priority value is based at least in part on the first semantic label value; and
prioritizing the first object over the second object based on a function of the first display priority value; and
in response to determining that each of the first object and the second object satisfies an offscreen criterion, displaying, on the display, a first offscreen indicator that is associated with the first object according to the prioritization.

2. The method of claim 1, wherein, in response to determining that each of the first object and the second object satisfies the offscreen criterion, foregoing display of a respective offscreen indicator associated with the second object according to the prioritization.

3. The method of claim 1, further comprising, while presenting the plurality of objects, obtaining a second display priority value that is associated with the second object, wherein prioritizing the first object over the second object is also based on a function of the second display priority value.

4. The method of claim 3, wherein prioritizing the first object over the second object includes determining that the first display priority value is higher than the second display priority value.

5. The method of claim 1, further comprising:
obtaining a third display priority value that is associated with a third object of the plurality of objects;
prioritizing the third object over the second object based on a function of the third display priority value; and
in response to determining that the third object satisfies the offscreen criterion, displaying, on the display, a second offscreen indicator that is associated with the third object according to the prioritization.

6. The method of claim 1, further comprising:
obtaining one or more object characteristic criteria; and
determining the first display priority value based on a function of the first object and the one or more object characteristic criteria.

7. The method of claim 6, wherein the one or more object characteristic criteria include an object importance criterion.

8. The method of claim 1, further comprising:
obtaining one or more user preference criteria; and
determining the first display priority value based on a function of the first object and the one or more user preference criteria.

9. The method of claim 1, wherein determining the first display priority value includes determining a first engagement score that characterizes a level of user engagement with respect to the first object.

10. The method of claim 9, wherein determining the first engagement score is based on eye tracking data that is indicative of a gaze position, including determining a spatial relationship between the gaze position and the first object.

11. The method of claim 9, wherein determining the first engagement score is based on extremity tracking data that is indicative of an extremity position, including determining a spatial relationship between the extremity position and the first object.

12. The method of claim 1, further comprising determining a second engagement score that characterizes a level of user engagement with respect to the second object, wherein prioritizing the first object over the second object is further based on a function of the second engagement score.

13. The method of claim 1, wherein the first object represents a physical object, and wherein determining that the first object satisfies the offscreen criterion includes performing a computer-vision technique with respect to the first object.

14. The method of claim 1, wherein determining that each of the first object and the second object satisfies the offscreen criterion includes:
   determining that at least a portion of the first object is positioned at less than a threshold distance from a first edge of the display; and
   determining that at least a portion of the second object is positioned at less than a threshold distance from a second edge of the display.

15. The method of claim 1, wherein determining that each of the first object and the second object satisfies the offscreen criterion is in response to ceasing to present the first object and the second object.

16. The method of claim 1, wherein the first offscreen indicator corresponds to a representation of the first object, and wherein displaying the first offscreen indicator includes replacing the first object with the first offscreen indicator.

17. The method of claim 1, wherein at least one of the first object and the second object corresponds to a respective animation that satisfies the offscreen criterion.

18. The method of claim 1, wherein the electronic device includes an input device, the method further comprising:
   detecting, via the input device, a positional change input that corresponds to a positional change of the electronic device; and
   determining that at least one of the first object and the second object satisfies the offscreen criterion based on the positional change input.

19. The method of claim 1, further comprising:
   while displaying the first offscreen indicator, detecting, via an input device, a positional change input that corresponds to a positional change of the electronic device; and
   moving the first offscreen indicator to a different position on the display based on the positional change input.

20. The method of claim 1, wherein the first semantic label value provides an understanding or meaning with respect to the first object, the method further comprising obtaining a second semantic label value associated with the second object, wherein the second semantic label value provides an understanding or meaning with respect to the second object, and wherein prioritizing the first object over the second object includes comparing the first semantic label value against the second semantic label value.

21. The method of claim 1, wherein determining the first object satisfies the offscreen criterion includes identifying a last-displayed position of the first object on the display before the first object ceases to be presented, and wherein displaying the first offscreen indicator includes displaying a representation of the first object at the last-displayed position of the first object on the display.

22. An electronic device comprising:
   one or more processors;
   a non-transitory memory;
   a display; and
   one or more programs, wherein the one or more programs are stored in the non-transitory memory and configured to be executed by the one or more processors, the one or more programs including instructions for:
      while presenting, on the display, a plurality of objects including a first object and a second object:
         obtaining a first semantic label value associated with the first object;
         determining a first display priority value that is associated with the first object, wherein determining the first display priority value is based at least in part on the first semantic label value; and
         prioritizing the first object over the second object based on a function of the first display priority value; and
      in response to determining that each of the first object and the second object satisfies an offscreen criterion, displaying, on the display, a first offscreen indicator that is associated with the first object according to the prioritization.

23. A non-transitory computer readable storage medium storing one or more programs, the one or more programs comprising instructions, which, when executed by an electronic device with one or more processors and a display, cause the electronic device to:
   while presenting, on the display, a plurality of objects including a first object and a second object:
      obtain a first semantic label value associated with the first object;
      determine a first display priority value that is associated with the first object, wherein determining the first display priority value is based at least in part on the first semantic label value; and
      prioritize the first object over the second object based on a function of the first display priority value; and
   in response to determining that each of the first object and the second object satisfies an offscreen criterion, display, on the display, a first offscreen indicator that is associated with the first object according to the prioritization.

* * * * *